Figure 1:
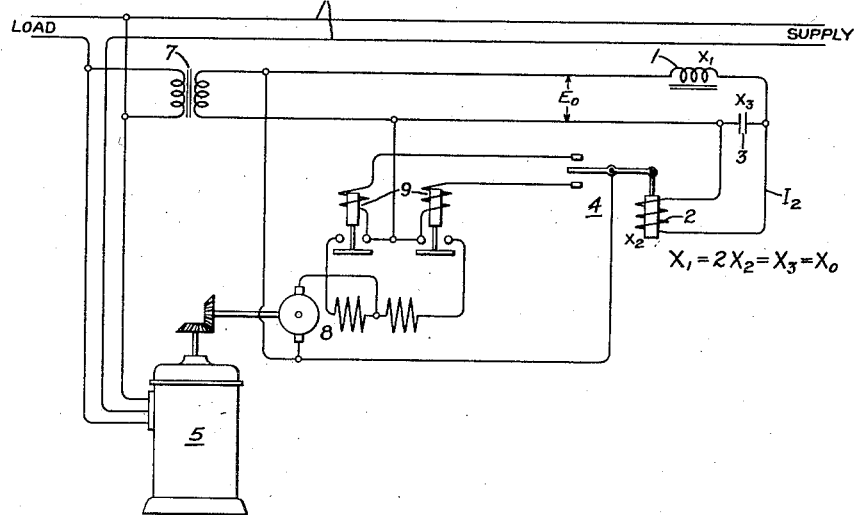

July 25, 1939.  W. E. BIRCHARD  2,167,473

ELECTRORESPONSIVE CIRCUITS

Original Filed July 3, 1937

Inventor:
Wayne E. Birchard,
by Harry E. Dunham
His Attorney.

Patented July 25, 1939

2,167,473

UNITED STATES PATENT OFFICE 2,167,473

ELECTRORESPONSIVE CIRCUITS

Wayne E. Birchard, Pittsfield, Mass., assignor to General Electric Company, a corporation of New York Application July 3, 1937, Serial No. 151,892
Renewed March 29, 1939

9 Claims. (Cl. 175—320)

My invention relates to electroresponsive circuits and more particularly to improvements in monocyclic contact-making voltmeter circuits.

In an application, Serial No. 150,587, (now Patent No. 2,148,301, granted February 21, 1939) which is assigned to the assignee of the present case and which was filed June 26, 1937, entitled "Electroresponsive circuits", in the name of William W. Kuyper as a continuation-in-part of his application Serial No. 103,105, filed September 29, 1936, there is disclosed and broadly claimed an arrangement which may be conveniently called a monocyclic electroresponsive device. It consists of a monocyclic network and an electroresponsive device which are so related that the input terminals of the network are connected to respond to the quantity to be measured and the output terminals of the network are connected to the electroresponsive device. It is particularly well adapted to voltmeters.

A monocyclic network may be defined as two or more opposite sign, and usually numerically equal, reactances so interconnected that they act as a constant potential to constant current transformer or converter in the sense that with a constant potential input to the network the output current is independent of the load magnitude and power factor. The theory of such networks is discussed in Chapter XIV of the "Theory and Calculation of Electric Circuits" by C. P. Steinmetz, McGraw-Hill Book Company, 1917.

The Kuyper arrangement greatly reduces the losses in voltmeter circuits and at the same time it eliminates the ordinary frequency and temperature errors in such circuits. Ordinary frequency and temperature errors arise as a result, respectively, of changes in the reactance and the resistance of the voltmeter coil with changes in frequency and temperature. The presence of the monocyclic network renders the voltmeter current independent of the voltmeter coil reactance and resistance so that these ordinary errors are eliminated. Heretofore such errors have been minimized by a relatively high substantially zero temperature coefficient resistance in series with the voltmeter coil. However, the resistance of the elements of the monocyclic network is very small and consequently the loss in the network is negligible.

On investigating the performance of the Kuyper arrangement, I have discovered certain unexpected frequency and temperature errors to exist. These are ordinarily individually but a small fraction of a percent if the frequency and temperature vary no more than about ±1% and ±20 degrees Fahrenheit, respectively from given normal values. However, the sum of these errors may become quite substantial for certain circuits of this type if the frequency regulation is poor and the temperature varies widely. For example, if the monocyclic voltmeter is used as a control element for an outdoor voltage regulator for a feeder circuit which is energized by a Diesel electric plant having poor speed regulation, under which conditions the frequency might vary ±7% from the usual standard frequency of sixty cycles per second and the temperature will often vary all the way from 40° below zero Fahrenheit to 120° above zero Fahrenheit, the combined frequency and temperature error may easily exceed ±5%, whereas for such service the tolerable voltage error should be less than ±1%.

In accordance with my invention, I substantially eliminate all of these errors by so proportioning the impedance characteristics of the elements of the circuit that they have certain predetermined relations.

An object of my invention is to provide a new and improved electroresponsive circuit.

Another object of my invention is substantially to eliminate the frequency error in a monocyclic voltmeter circuit.

A further object of my invention is substantially to neutralize the resistance frequency error in a monocyclic voltmeter circuit.

An additional object of my invention is substantially to neutralize the temperature error due to capacity and resistance changes in a monocyclic voltmeter circuit.

My invention will be better understood from the following description taken in connection with the accompanying drawing and its scope will be pointed out in the appended claims.

Figure 2:
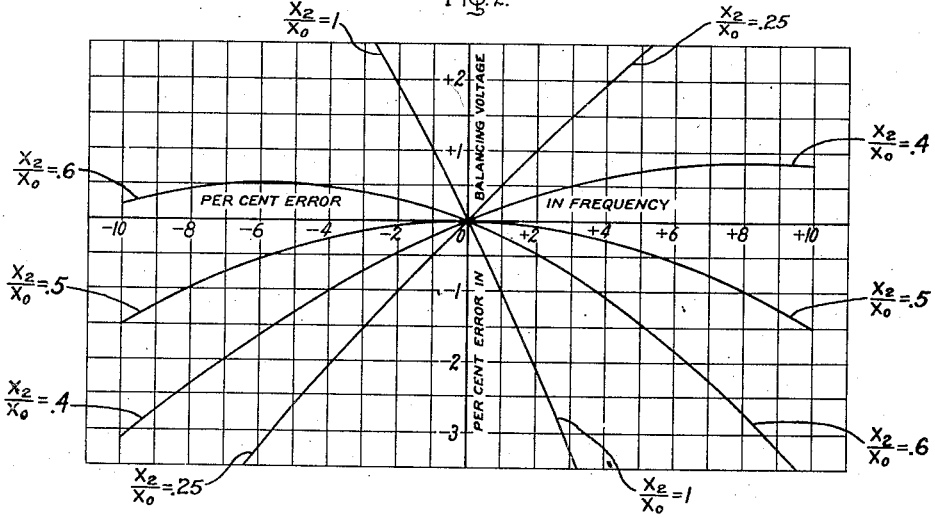
Figure 3:
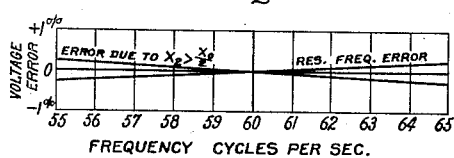
Figure 4:
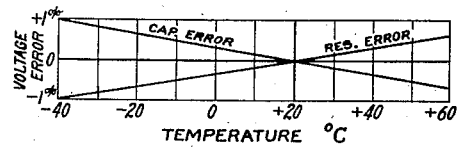

In the drawing Fig. 1 is a diagrammatic showing of an automatic induction feeder voltage regulator provided with a monocyclic contact-making voltmeter control circuit embodying my invention; Fig. 2 is a set of curves showing how my invention achieves minimum frequency error when resistance is neglected; Fig. 3 is a set of curves illustrating neutralization of resistance frequency error; and Fig. 4 is a set of curves showing the neutralization of temperature errors in my circuit.

Referring now to the drawing and more particularly to Fig. 1, the monocyclic voltmeter is shown as comprising a reactor 1, a voltmeter coil 2 and a capacitor 3. The capacitor 3 is connected in series with reactor 1 and in parallel with the voltmeter coil 2. The voltmeter is shown by way of example as a contact-making voltmeter 4 for controlling an outdoor feeder voltage regulator 5 for an alternating current feeder circuit 6. To this end the voltmeter circuit is connected to respond to the voltage of the feeder circuit, preferably at reduced voltage, by connecting it thereacross on the load side of the regulator through a conventional potential transformer 7. The regulator is operated by a reversible motor 8 and as the contacts of the voltmeter 4 are usually not well adapted to carry the motor current, conventional auxiliary relays 9 are interposed between the meter and the motor. Both the relay circuits and the motor circuits may be energized from any suitable source of supply and as shown they are both energized from the secondary winding of the potential transformer 7.

The theoretical basis for the operation of this circuit is as follows:

If $E_0$ is the voltage supplied to the input terminals of the voltmeter circuit, $I_2$ is the current in the voltmeter coil, and $Z_1$, $Z_2$ and $Z_3$ are the impedances respectively of the reactor 1, the voltmeter coil 2 and the capacitor 3, then it can be shown by analogy to Ohm's law that (1) $$I_2 = \frac{E_0 Z_3}{Z_1 Z_3 + Z_2(Z_1 + Z_3)}$$

When the inductive reactance of 1 is made equal to the capacitive reactance of 3 and the reactor and capacitor resistances are neglected, that is when $Z_1 = +jX_0$ and $Z_3 = -jX_0$ then the above equation for the voltmeter current simplifies to (2) $$I_2 = -\frac{jE_0}{X_0}$$

The above Equation 2 shows that the voltmeter current derived from the output terminals of the monocyclic network is independent of the voltmeter coil impedance and is directly proportional to the voltage applied to the monocyclic circuit.

The voltmeter 4 is so constructed that when the voltage of circuit 6 is normal the current in coil 2 produces a magnetic pull just sufficient to balance the voltmeter in its neutral position. If now the voltage should increase or decrease the magnet core in coil 2 will move up or down, respectively, thereby causing the contact-making voltmeter to close one or the other of its sets of contacts whereby the proper intermediate relay is energized to cause the motor 8 to turn the regulator 5 in the proper direction to restore the voltage to normal. As soon as the voltage comes back to normal the contact-making voltmeter again balances and the motor stops. In this way, automatic voltage regulation is secured.

At normal main circuit voltage the output voltage of a typical potential transformer for energizing a voltage responsive control circuit of a regulator is 120 volts. At such a voltage I have found that monocyclic network elements having the following constants give good operation when the frequency of the supply voltage is 60 cycles per second. For the reactor 1 the inductance is 3.52 henries and the effective resistance is 138 ohms. For the capacitor 3 the capacitance is 2 microfarads and the equivalent series resistance is 2 ohms. These values of inductance and capacitance each give a reactance value of 1,326 ohms at 60 cycles. In a standard contact-making voltmeter, such as is shown for example in Patent No. 2,039,632, granted May 5, 1936 on an application of F. J. Champlin, and assigned to the assignee of the present application, the reactance of the coil with the solenoid plunger in its normal voltage position is about 26 ohms at 60 cycles and the effective resistance at this frequency is about 11 ohms, based on a 2 watt power consumption in the coil at a current of .44 ampere. The normal terminal voltage of the coil is about 12 volts. The remainder of the normal 120 volts applied to the meter circuit is absorbed in the usual series resistor. Such a voltmeter coil represents a burden of about 5 voltamperes on the monocyclic network.

As the normal coil current of the conventional voltmeter described above is .44 ampere and the output current of the above-described monocyclic network is about .09 ampere (obtained from Equation 2 by substituting 120 and 1326 for $E_0$ and $X_0$ respectively) they are not adapted for direct connection as shown in Fig. 1. This difficulty may readily be overcome in any number of alternative and obvious ways. Thus, the voltmeter coil may be rewound with smaller wire for a .09 ampere rating, or a .09–.44 ratio current transformer may be interposed between the monocyclic network and the voltmeter coil, or the monocyclic network output current may be increased to .44 ampere. The latter could be done by either increasing the input voltage to 583 volts without changing the reactance or decreasing the reactance to 273 ohms without changing the input voltage. Obviously, also a suitable combination of any two or more of these methods may be used.

At exactly 60 cycles per second the above-specified combination of monocyclic circuit and voltmeter operates very accurately, but I have found that very slight departures of the frequency from 60 cycles cause quite appreciable frequency errors in that as the frequency increases the voltmeter current decreases, whereas as the frequency decreases the voltmeter current increases. In terms of automatic voltage regulator operation this means that the increased frequency causes a positive voltage error and a decrease in frequency causes a negative voltage error because the automatic operation of the voltage regulating system is such as to maintain constant current in the voltmeter coil and therefore an increased frequency causes the regulator to hold too high a voltage while a decreased frequency causes the regulator to hold too low a voltage.

The primary cause of this frequency error is that the reactive values of the reactor 1 and the capacitor 3 change in opposite directions for any given change in frequency. Thus an increased frequency increases the ohmic reactance of the inductive reactor and decreases the ohmic reactance of the capacitor, while a decrease in frequency causes exactly opposite changes in the ohmic reactance values of the reactive elements.

While investigating this frequency error I have discovered that when the reactance of the voltmeter coil is ½ the monocyclic reactance, the frequency error is substantially a minimum. In fact, when the ratio $X_2/X_0 = \frac{1}{2}$, the voltage error for any ordinary change in frequency on a commercial 60 cycle circuit is considerably less than 1% change in voltage held by the regulator. When this ratio is less than ½ increases in frequency cause the regulator to hold too high a voltage and when this ratio is greater than ½ increases in frequency cause the regulator to hold too low a voltage.

This result may be explained by the following theory: Assume that the frequency changes by $a$ per unit value "$a$", becoming $$f' = f(1+a),$$

where $f'$ = new frequency in cycles per second, and $f$ = the old frequency.

Then (3)
$$\begin{cases} Z_1 = r_1 + jX_0(1+a) \\ Z_2 = r_2 + jX_2(1+a) \\ Z_3 = r_3 - jX_0\left(\frac{1}{1+a}\right) \end{cases}$$

where $r_1$, $r_2$ and $r_3$ are the respective resistances of elements 1, 2 and 3.

Substituting these values in Equation 1 above, the following equation is obtained.

(4) $I_2 = \dfrac{E_0[r_3 - jX_0/(1+a)]}{[X_0^2 - X_0X_2(2a+a^2) + (r_1r_2+r_2r_3+r_1r_3)] + j[X_0\{r_2(2a+a^2)/(1+a) + r_2(1+a) - r_1/(1+a)\} + X_2(r_1+r_3)(1+a)]}$ For practical cases it is found that the real term in the numerator may be neglected in comparison with the imaginary, and that the imaginary term in the denominator may be neglected in comparison with the real term. Then Equation 4 simplifies to 5.

(5) $I_2 = \dfrac{-jE_0}{X_0 + (X_0 - 2X_2)a - X_2(3a^2+a^3) + (1+a)(r_1r_2+r_2r_3+r_1r_3)/X_0}$ By a mere transposition of terms this equation may be rewritten to give the balancing voltage of the voltmeter in terms of the voltmeter current $I_2$ thus:

(6) $E_0 = jI_2[X_0 + (X_0 - 2X_2)a - X_2(3a^2+a^3) + (1+a)(r_1r_2+r_2r_3+r_1r_3)/X_0]$

Frequency errors in balancing voltage arise from those terms containing "$a$" or its powers. Considering variations in frequency up to 3 cycles in 60, "$a$" has a value of 0.05 or less. Therefore $a^2$ and $a^3$ are very small compared with "$a$". The resistances are small compared to the reactances, so that the last term in 6 is relatively small. The chief frequency error evidently lies in the term $a(X_0 - 2X_2)$. If, therefore, the solenoid reactance is made equal to half the monocyclic reactance this term vanishes, and with it most of the frequency error. Therefore, when $$X_2 = \frac{X_0}{2}$$

(7) $E_0 = jI_2[X_0(1 - 3a^2/2 - a^3/2) + (r_1r_2+r_2r_3+r_1r_3)(1+a)/X_0]$

If resistances are neglected the frequency errors in balancing voltage are represented by the curves shown in Fig. 2. They clearly show that when $X_2$ is equal to ½ $X_0$ the frequency in per cent balancing voltage is a minimum.

As an example of how this ½ ratio may be secured in a practical manner, I rewound the above specified voltmeter solenoid with more turns of finer wire so as to increase its inductance to a value of 1.76 henries, which at 60 cycles per second will give an inductive reactance of 663 ohms. This is just ½ the previously given $X_0$ value of 1326 ohms. This coil had an effective resistance value of 270 ohms and operated at 60 volts across its terminals when 120 volts was applied to the monocyclic circuit. At this voltage the current was .09 ampere giving a watt loss and volt ampere burden about equal to an ordinary voltmeter coil.

The small contribution to frequency error introduced by the presence of the resistance term in Equation 7 is represented by the straight line with positive slope in Fig. 3 of the drawing. I have found that by making the solenoid reactance slightly greater than one-half the series reactance an almost equal but opposite error can be introduced, leaving only the small error represented by the one-half ratio parabolic curve in Fig. 2. For the particular circuit whose constants have been given above, Fig. 3 is not quite to scale. Actually it exaggerates the errors slightly.

Thus, if $X_2 = (1+b)X_0/2$, where $b$ is the increase in the ratio of $X_2$ to $X_0$ necessary to neutralize the resistance frequency error, the value of $b$ can be found by substituting the new value of $X_2$ just given in Equation 6. The resulting equation is:

(8) $E_0 = jI_2[X_0 - X_2(3a^2+a^3) - abX_0 + (1+a)(r_1r_2+r_2r_3+r_1r_3)/X_0]$

It will be seen from this equation that if $b$ is given the proper value the last two terms of the equation can be made to add up to zero and thus neutralize each other.

As has been previously mentioned, feeder voltage regulators are sometimes mounted out-of-doors. In many localities they are subjected to temperatures ranging from 40° below to 120° above zero F. The resistance of the voltmeter circuit inductive elements 1 and 2 changes with temperature. Fortunately, capacitor values also change with temperature, in some cases, as for example the oil-filled type, as a linear function thereof. I have found that the voltage errors caused by these changes in capacity and resistance are opposite, the capacitance error being such as to cause a decrease in voltage held by the regulator for increases in temperature and the resistance error being such as to cause an increase in voltage held by the regulator for increases in temperature. Furthermore, I have found that by making the effective resistance of the series inductive element of the proper value, these two errors can be exactly balanced out.

These two errors are shown in Fig. 4, wherein they are so proportioned as exactly to balance each other out. The temperatures in Fig. 4 are given in degrees centigrade, but −40° is the same on both the centigrade and Fahrenheit scales and 50° above zero C. corresponds to about 120° above zero F.

This balancing out of the temperature error may be explained as follows: Let the per unit change in capacity be "$c$". Then (9) $Z_3 = r_3 - jX_0/(1+c)$ For an increase in temperature "$c$" is positive, and for a decrease "$c$" is negative. When the value of $Z_3$ from Equation 9 is substituted in Equation 1 and the equation is simplified by dropping small quadrature terms the following equation is obtained:

(10) $I_2 = \dfrac{-jE_0}{X_0 - cX_2 + (r_1r_2+r_2r_3+r_1r_3)(1+c)/X_0}$

Since the term containing resistances is small compared to $X_0$, and $X_2 = X_0/2$, then

(11) $E_0 = jI_2X_0(1 - c/2)$

Thus, the error in balancing voltage due to capacitor change is equal to half the percentage error in capacity.

The resistance temperature error may be determined as follows: Let "$d$" represent the per unit change in the effective resistances $r_1$ and $r_2$. Neglect the change in $r_3$, the equivalent series resistance of the capacitor, since $r_3$ is a very small quantity. Then $$(12) \quad \begin{cases} Z_1 = r_1(1+d) + jX_0 \\ Z_2 = r_2(1+d) + jX_2 = r_2(1+d) + jX_0/2, \\ Z_3 = r_3 - jX_0 \end{cases}$$

If now these values are substituted in Equation 6 and it is assumed that the frequency error "$a$" be zero then all the terms containing "$a$" in the equation vanish and the equation becomes $$(13) \quad E_0 = jI_2\{X_0 + (r_1r_2 + r_2r_3 + r_1r_3)/X_0 + (r_1r_3 + r_2r_3 + r_1r_2[2+d])d/X_0\}$$

The resistance temperature error arises from the last term in Equation 13. By properly choosing any one of the resistances $r_1$, $r_2$ or $r_3$ the resistance error may be made substantially equal and opposite to the capacitor error because it is found that for practical cases the percentage error does not deviate greatly from a straight line function of temperature even over the range from $-40°$ C. to $+50°$ C. As a practical matter the resistance $r_2$ of the coil is pretty well fixed by other criteria of its design and the equivalent resistance of the capacitor $r_3$ is difficult to vary. Consequently, $r_1$ is the only practical resistance which may be altered so as to balance out the capacitor temperature error. For the particular monocyclic voltmeter circuit for which the constants have already been given, the capacitor was of the oil-filled type having such a change in capacitance for changing temperature that to neutralize the error produced thereby the effective resistance of the series inductive reactance should be 138 ohms.

The small error in balancing voltage of the contact-making voltmeter due to dimensional changes in the voltmeter with temperature variations has the same sign as the capacitor error and consequently may be balanced out by a small further increase in $r_1$.

The effect of voltage wave distortion on my voltmeter circuit is small because the series reactor virtually blocks harmonic currents, so that the error due to harmonic voltages is practically equal to their contribution to the root mean square value of the line voltage. The 4% each of third and fifth harmonics considered as maximum commercial voltage distortion increase the rms voltage only about 1/6 of 1% above the fundamental value.

By reason of the great decrease in losses in the voltmeter circuit produced by the use of a monocyclic network in place of a series resistor, the input to the voltmeter coil may be increased with a corresponding gain in such items as voltage sensitivity, contact pressure, or ruggedness of construction. The input to the present voltmeter solenoid could be doubled without exceeding 5 watts voltmeter circuit loss which is still a great reduction from the heretofore usual loss of about 52 watts.

The monocyclic network is not limited to use with the present contact-making voltmeter, for it can be applied to eliminate temperature and frequency errors in almost any electroresponsive relay, circuit or device having one or a plurality of operating coils or no coils at all. Furthermore, it is only necessary that the effective reactance of the load on the monocyclic network be inductive and substantially one-half the monocyclic reactance. For example, the load on the monocyclic network may be made up of a wide variety of combinations of reactance of different sign so long as the resultant of effective reactance of each combination is inductive in character and substantially one-half the monocyclic reactance in magnitude.

While I have shown and described a particular embodiment of my invention, it will be obvious to those skilled in the art that changes and modifications may be made, and I, therefore, aim in the appended claims to cover all such changes and modifications as fall within the true spirit and scope of my invention.

What I claim as new and desire to secure by Letters Patent of the United States, is,—

1. In combination, an electric circuit, means for deriving therefrom an alternating potential proportional to a variable quantity associated with said circuit, a monocyclic network having input terminals connected to be energized by said means, said network having output terminals, and electroresponsive means connected to said output terminals, said network comprising opposite sign reactance elements having substantially equal ohmic reactance values at a predetermined nominal frequency at which said network is adapted to be energized, said electroresponsive means having an effective reactance which is substantially one-half the reactance of said network elements at said frequency.

2. In a voltmeter circuit adapted for use on commercial alternating current power circuits, a monocyclic network having input terminals adapted to be energized in accordance with the voltage of such a power circuit, said network having output terminals, and voltmetric apparatus connected to said output terminals, said network comprising opposite sign reactance elements having substantially equal ohmic reactance values at the rated frequency of such a power circuit, said voltmetric apparatus having a reactance which is substantially one-half the reactance of said network elements at said frequency.

3. In a voltmeter circuit adapted for use on commercial alternating current power circuits, a monocyclic network having input terminals adapted to be energized in accordance with the voltage of such a power circuit, said network having output terminals, and a voltmeter coil connected to said output terminals, said network comprising opposite sign reactance elements having substantially equal ohmic reactance values at a predetermined nominal frequency, at which said voltmeter circuit is adapted to be energized, said voltmeter circuit being subject when the frequency varies to an error caused by the inherent resistance of the inductive portion of said network, said error being substantially neutralized by making the ohmic inductive reactance of said voltmeter coil at said nominal frequency enough different from one-half said reactive values of said network elements to introduce a substantially equal and opposite error over a normal working range of frequency on both sides of said normal frequency.

4. In combination, an alternating current circuit, a circuit for measuring an electrical quantity associated with said alternating current circuit, said measuring circuit including a monocyclic network connected to respond to said quantity, and a measuring instrument connected to be energized by said network, said network comprising opposite sign reactance elements having substantially equal ohmic reactance values at a predetermined nominal frequency at which said measuring circuit is adapted to be energized, said measuring circuit having a resistance frequency error, said error being substantially neutralized by providing the measuring instrument with an inductance of such a value that its reactance at said nominal frequency exceeds slightly one-half the reactance of the elements of said monocyclic network.

5. In combination, an electrical measuring device, a monocyclic network through which said measuring device is adapted to be energized, said monocyclic network including a capacitor whose capacitance changes with temperature so as to introduce a temperature error in the response of said measuring device, said device and said network including elements, the resistance of at least one of which varies with temperature so as to introduce an opposite error in the response of said measuring device, one of said elements being so constructed that its resistance is of the proper value to cause the resistance temperature error substantially to neutralize the capacitance temperature error.

6. In a voltmeter circuit adapted for use on commercial alternating current power circuits, a monocyclic network having input terminals adapted to be connected to respond to the voltage of said circuit, said network having output terminals, and a voltage responsive device connected to said output terminals, said network having a capacitive element whose capacitive reactance varies with temperature enough to cause appreciable temperature errors in said voltmeter circuit over a given temperature range, said device and said network having elements whose resistance varies with temperature enough to introduce an appreciable oppositely varying error in said voltmeter circuit over said temperature range, the resistance of said network element being so chosen that these errors substantially neutralize each other over said temperature range.

7. In a voltmeter circuit adapted for use on commercial alternating current power circuits, a monocyclic network having input terminals adapted to be energized in accordance with the voltage of said circuit, said network having output terminals, a voltmeter connected to said output terminals, said network having an inductive element whose inherent resistance varies with temperature enough to introduce an appreciable temperature error in said voltmeter circuit over said temperature range, said voltmeter having dimensional changes with temperature which produce an opposite error in said voltmeter circuit, said inductive element being so proportioned that its resistance is of the proper value so that the temperature error in the voltmeter circuit due to dimensional changes in the voltmeter is substantially neutralized.

8. In combination, a commercial alternating current power circuit, a voltmeter circuit including a monocyclic network connected to be energized in accordance with the voltage of said circuit, and a voltmeter coil connected to be energized through said network, the reactances of the network elements and the reactance of the voltmeter coil being so matched that variations in frequency of ± two cycles from sixty cycles produces a maximum net error in voltmeter response of the order of ⅛ of 1%.

9. In a voltage measuring circuit adapted to control an outdoor automatic feeder voltage regulator, a primary control circuit consisting of a primary relay coil and a capacitor connected in parallel with each other and in series with an inductance coil, said control circuit being connected so as to be energized in accordance with the voltage of a feeder circuit to be regulated, said control circuit being compensated for frequency errors by making the reactive values of said capacitor and inductive coil substantially equal to each other at the nominal frequency of said circuit and equal to substantially twice the inductive reactance of said relay coil at said frequency, said circuit being compensated for temperature error by matching the temperature characteristic of the resistance of said inductive coil with the temperature characteristic of said capacitor.

WAYNE E. BIRCHARD.